United States Patent [19]

Anderson et al.

[11] Patent Number: 4,817,944
[45] Date of Patent: Apr. 4, 1989

[54] APPARATUS FOR RETAINING WEIGHTS ON A BARBELL

[75] Inventors: Gregory H. Anderson, Plano; Alan B. Tarrant, Leonard, both of Tex.

[73] Assignee: Charles Aaron, a part interest

[21] Appl. No.: 139,466

[22] Filed: Dec. 30, 1987

[51] Int. Cl.[4] .............................................. A63B 13/00
[52] U.S. Cl. ................................. 272/123; 24/129 R; 24/129 D
[58] Field of Search ............. 272/122, 123; 24/129 R, 24/129 B, 129 D, 130; 248/251, 231.3

[56] References Cited

U.S. PATENT DOCUMENTS

| | | |
|---|---|---|
| 730,580 | 6/1903 | Stanford . |
| 1,782,701 | 11/1930 | Tuck ................................ 248/251 X |
| 2,244,351 | 6/1941 | Venables . |
| 2,275,737 | 3/1942 | Dacey ........................... 24/129 B X |
| 2,617,363 | 11/1952 | Anketell ............................ 24/129 R |
| 2,649,634 | 8/1953 | Kessler ..................................... 24/68 |
| 2,650,448 | 9/1953 | Lichtig ............................. 24/129 D |
| 2,732,920 | 1/1956 | Newton .................................. 189/45 |
| 3,026,104 | 3/1962 | Gerth et al. ............................. 267/70 |
| 3,032,806 | 5/1962 | Mallory .................................... 16/66 |
| 3,289,242 | 12/1966 | Mallory .................................... 16/66 |
| 3,305,234 | 2/1967 | Cline et al. . |
| 3,726,522 | 4/1973 | Silberman . |
| 3,771,785 | 11/1973 | Speyer ..................................... 272/123 |
| 4,256,197 | 3/1981 | Kiser, Jr. ............................... 180/335 |
| 4,381,585 | 5/1983 | Morel ..................................... 24/270 |
| 4,569,105 | 2/1986 | Weider ................................... 24/488 |
| 4,639,979 | 2/1987 | Polson ................................... 24/270 |
| 4,646,398 | 3/1987 | Myhrman ........................ 272/123 X |
| 4,773,641 | 9/1988 | Metz .................................... 272/123 |

FOREIGN PATENT DOCUMENTS 1212276  3/1966  Fed. Rep. of Germany ........ 24/130

Primary Examiner—Richard J. Apley
Assistant Examiner—Richard W. Bahr
Attorney, Agent, or Firm—Hubbard, Thurman, Turner & Tucker

[57] ABSTRACT

An apparatus for retaining a weight on a barbell includes a collar member and a weight engagement portion. The collar member has an annular rigid outer section and a radially inner frictional gripping portion, and defines an opening through the collar member to allow the collar to closely and slidably receive the end of the barbell. The weight engagement portion is associated with the annular, rigid outer section of the collar member in such a manner that axially outward movement of the weight or axially outward force thereon will contact the weight engagement portion and/or increase the force thereon, causing the axis of the collar member to skew and/or increase its skewedness with respect to the axis of the barbell, thereby frictionally locking the apparatus onto the bar. This frictional locking may also be achieved by skewing the aforesaid axes by hand, separate and apart from any contact between the weight and the apparatus.

14 Claims, 2 Drawing Sheets

U.S. Patent Apr. 4, 1989 4,817,944
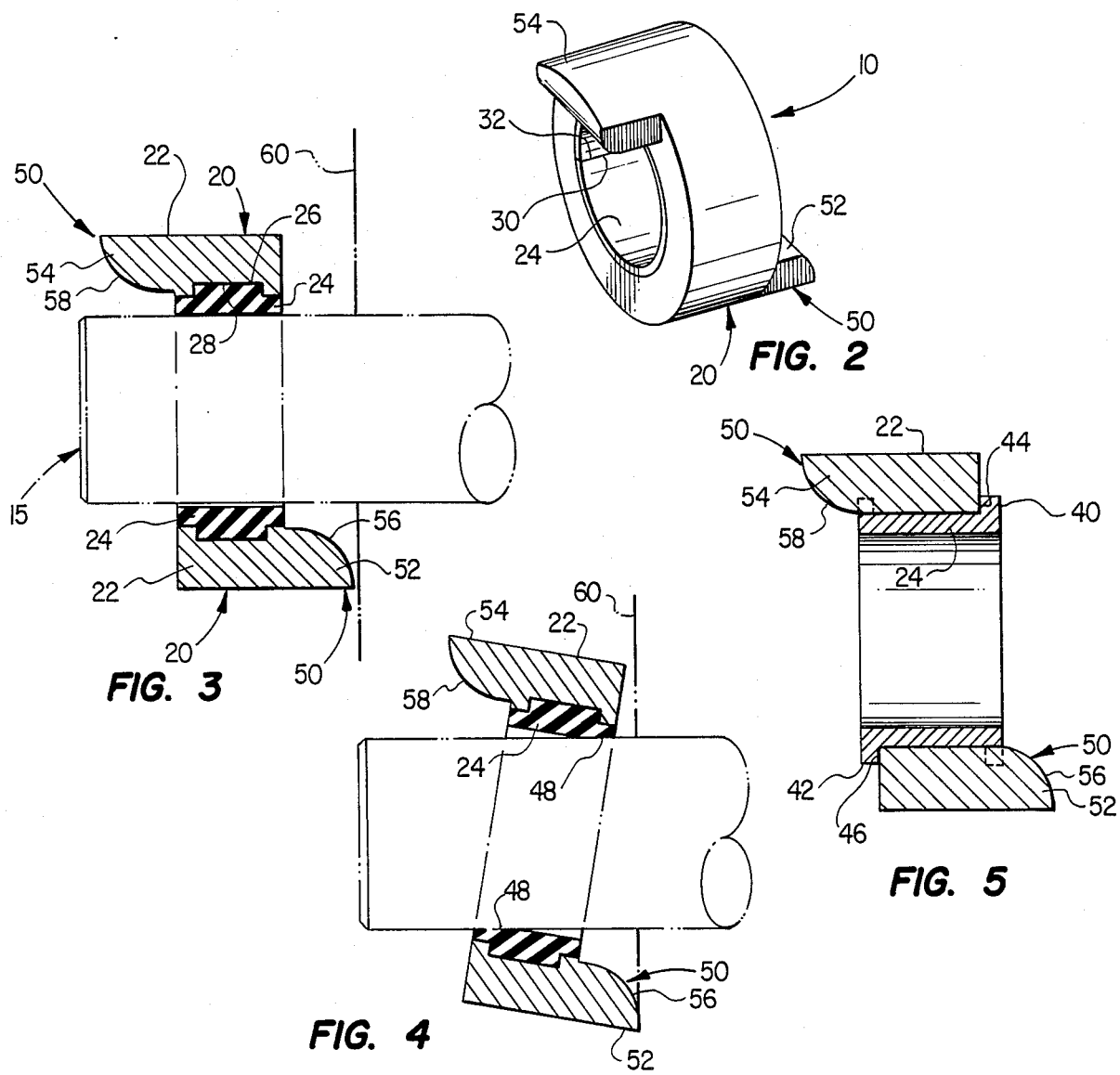

APPARATUS FOR RETAINING WEIGHTS ON A BARBELL

BACKGROUND OF THE INVENTION

The present invention relates generally to weightlifting and barbell devices used therein, and more particularly provides a unique apparatus for retaining weights on such a barbell device.

As is well known, barbells used in the sport of weight lifting are provided with disc-shaped weights that can be mounted alone or in combination on the end of a bar, to allow the user to vary the weight he lifts during his workout. These weight discs have holes through their centers to allow the bar to be inserted through the discs. Various types of collars can be placed on the bar between the outermost weight disc and the end of the bar, to secure the weight discs on the bar.

In order for the sport of weight lifting to be practiced safely, it is desirable for the collar to be secure. Without proper security, a weight disc may become dislodged, and/or the barbell may become imbalanced, and cause injury to the weight lifter or to bystanders.

In order for the sport of weightlifting to be practiced conveniently, it is desirable that the collar be quickly and easily removed. This allows the weight lifter to vary the load on the barbell with a minimum interruption of time and/or interruption in the weightlifter's mental concentration.

In general, prior art collars that are secure and have desirable safety characteristics are not convenient to use, in that they are not easily and quickly removable. Furthermore, prior art collars or other types of weight disc retaining devices generally have a relatively fixed amount of frictional force holding them in place on the bar; that is, the amount of frictional force with which the collar is initially loaded does not change during the weight lifting exercise. The "safety" of the aforementioned prior art is therefore "fixed" in comparison to the present invention, whose "safety" may increase during a lift due to increased frictional gripping of the apparatus onto the bar, as more fully described below. Examples of such devices are set forth in U.S. Pat. Nos. 4,639,979; 3,305,234; 4,569,105; 4,646,398; and 3,726,522.

It is accordingly an object of the present invention to provide improved apparatus for retaining weights on barbells which, compared to conventional retaining devices, is both safer and more convenient to use.

SUMMARY OF THE INVENTION

In carrying out principles of the present invention, in accordance with a preferred embodiment thereof, improved apparatus is provided for retaining weights on a barbell and comprises a collar member and a weight engagement means. The collar member has an annular, rigid outer section nd an inner gripping means, and defines a central opening extending through the collar along a first axis. This central opening is sized and shaped to closely fit onto the end of the barbell, and the apparatus is slidable therealong when the first axis is substantially aligned with an axis of the end of the barbell.

The weight engagement means is associated with the annular, rigid outer section of the collar member. The weight engagement means provides the point of contact, if any, between the apparatus and the weight or weights on the bar. Any such forceable contact between the weight and the apparatus will skew the axis of the collar member with respect to the axis of the bar, increasing the frictional contact between the gripping means and the bar and frictionally locking the collar onto the bar.

The aforementioned skewing of axes and the corresponding frictional locking may be accomplished by hand, separate and apart from contact between the apparatus and the weight or weights. Additionally, any subsequent axially outward force or movement of the weight will increase the skewing of the axes, and correspondingly increase the frictional locking force.

BRIEF DESCRIPTION OF THE DRAWINGS

FIG. 1 is a perspective view of a barbell, weights (shown both solid and in phantom) and a weight retaining apparatus, all assembled and constructed in accordance with the present invention;

FIG. 2 is an enlarged scale perspective view of the weight retaining apparatus;

FIG. 3 is a cross-section of the barbell assembly shown in FIG. 1, taken along line 3—3, with the weight retaining apparatus in an "unlocked" position;

FIG. 4 is a cross-section of the barbell assembly similar to that shown in FIG. 3, but with the weight retaining apparatus in a "locked" position;

FIG. 5 is a cross-section of an alternate embodiment of the weight retaining apparatus;

DETAILED DESCRIPTION

Figure 6:
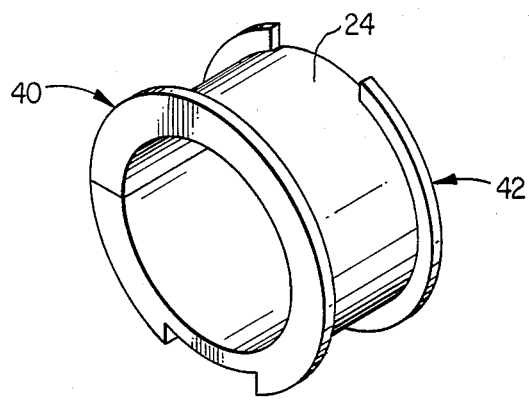
FIG. 6 is a perspective view of the radially inner gripping means portion of the alternate weight retaining apparatus embodiment depicted in FIG. 5.

Referring to FIGS. 1-4, shown therein and designated by the general reference numeral 10 is a preferred embodiment of a weight retaining apparatus constructed in accordance with the present invention. As shown in the drawings, the weight retaining apparatus 10 is comprised of a collar member 20 and a weight engagement means 50.

Collar member 20 includes an annular metal outer section 22 having a radially inner gripping means 24. The collar member has a central axial opening therein, which is sized to closely fit and slide upon an end of a weight bar 15. This close fit is loose enough to allow the collar member 20 to slide on bar 15 when the axes of each are substantially aligned, but tight enough to impede axial dislodgement of the collar from the bar.

The annular, radially inner gripping means 24 is carried within to the interior periphery of the radially outer section 22 as illustrated in FIG. 3. The rigid radially outer section 22 of collar member 20 has a U-shaped cross section as shown in FIG. 3, formed by groove 26 on the inside periphery of outer section 22. An annular external flange portion 28 of gripping means 24 is removably engaged in groove 26.

As further shown in the drawings, the radially inner gripping means 24 of apparatus 10 further comprises two adjacent opposite ends 30 and 32. The gripping means 24 can be removed from the outer section 22 by moving the ends 30 and/or 32 radially inward from the outer section 22, which effectively withdraws the flange portion 28 from groove 26 of outer section 22. Vulcanized rubber or other elastomeric and/or resilient materials are satisfactory materials for said gripping means.

Flange portion 28 preferably extends substantially the width of the groove 26 and substantially the peripheral length of the groove 26. The opening defined by said collar member 20 and gripping means 24 therein is of such dimension that, when the end of the weight bar extends through collar member 20 as shown in FIGS. 1, 3 and 4, the gripping means 24 will prevent relative axial movement of the apparatus 10 along the bar in a manner subsequently described, unless the collar 20 and the bar are substantially aligned axially.

Gripping means 24 may alternatively be permanently affixed to the interior surface of the outer section 22 by use of an adhesive or other substance, or may alternatively achieve affixation through two retaining lips 40 and 42, as shown in FIGS. 5 and 6, disposed on axially opposite sides of gripping means 24. Such retaining lips 40 and 42 are engageable with the external edges 44 and 46 respectively, of outer section 22, as shown in FIG. 5, so as to retain the gripping means 24 in its position relative to outer section 22. Gripping means 24 may further alternatively comprise a plurality of pieces, in contrast to the single piece construction indicated in the preferred embodiment.

Flange portion 28, and/or retaining lips 40 and 42, and/or the permanent affixation of the gripping means 24 to the interior periphery of the outer section 22, are constructed so that during practice of the invention, outer section 22 is restrained from moving axially relative to the gripping means 24.

As shown in the drawings, the present invention also comprises weight engagement means 50, shown in the preferred embodiment depicted in FIGS. 1-4 as two tab portions 52 and 54 fixedly positioned with respect to each other and with respect to collar member 20, on diametrically opposite sides of collar member 20 and on axially opposite sides of collar member 20. It is to be understood that only one such tab portion 52 or 54 is required for the invention to be practiced; the presence of two such tab portions, however, allows the weight retaining apparatus to be reversible axially. Additionally, it is to be understood that said weight engagement means 50 need only be relatively fixed with respect to collar member 20, such that said invention can be locked and unlocked as discussed below.

In the preferred embodiment, the tab portions 52 and 54 as well as the relatively rigid radially outer section 22 of the collar member 20 are of sufficient dimensions and strength to prevent deformation of same during the practice of the invention. Furthermore, the axial length of said tab portions 52 and 54 is such that when the invention is practiced and an axis of the apparatus 10 is skewed with respect to an axis of the weight bar 15, as more fully discussed below, the tab portion 52 or 54 can remain in contact with the face of a weight 60 on the end of the weight bar 15, while the diametrically opposite side of the weight retaining apparatus 10 remains relatively spaced apart from said weight 60.

In addition, in the preferred embodiment the tab portions 52 and 54 further comprise curved outer end surfaces 56 and 58 respectively. These curved surfaces improve the ease with which, and the degree to which, the axis of apparatus 10 may skewed and correspondingly realigned, with the axis of the weight bar 15.

These advantages are accomplished because curved surfaces 56 and 58 provide a relatively smooth contact surface for the skewing and/or realigning process, while allowing the contact point between the apparatus 10 and weight member 60 to move radially outward as the skewing increases, thus increasing the available leverage for positioning and "locking" said apparatus 10 on said bar 15.

These curved surfaces 56 and 58 additionally improve the operation of the apparatus in situations where the weight member 60 does not have a relatively planar surface for contacting the weight engagement means 50. Such surfaces allow non-planar features of such weight member to "ride under" the weight engagement means 50, causing the desired misalignment of the aforesaid axes.

Figure 7:
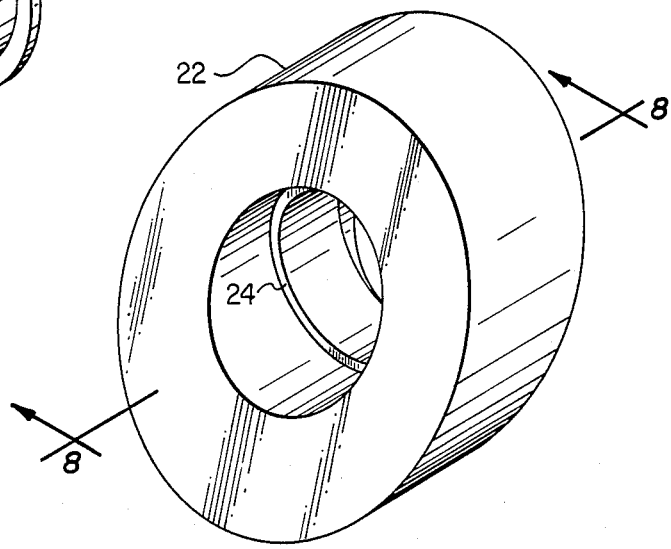
FIG. 7 is a perspective view of a further alternate embodiment of the weight retaining apparatus.
Figure 8:
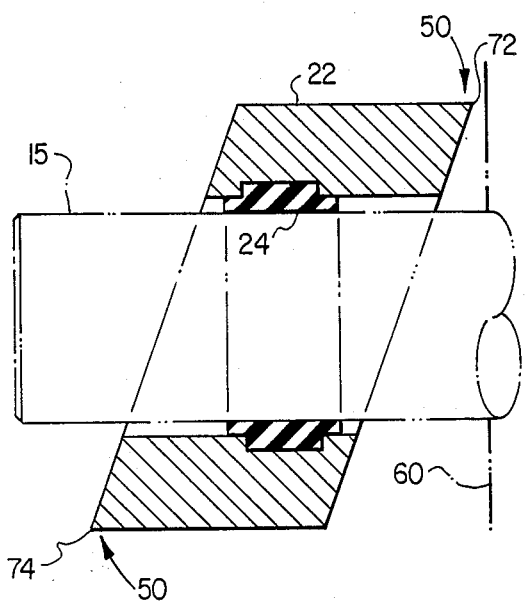
FIGS. 8 and 9 are cross-sections taken along line 8—8, illustrating the "unlocked" and "locked" positions, respectively, of the alternate embodiment of the weight retaining apparatus shown in FIG. 7.
Figure 9:
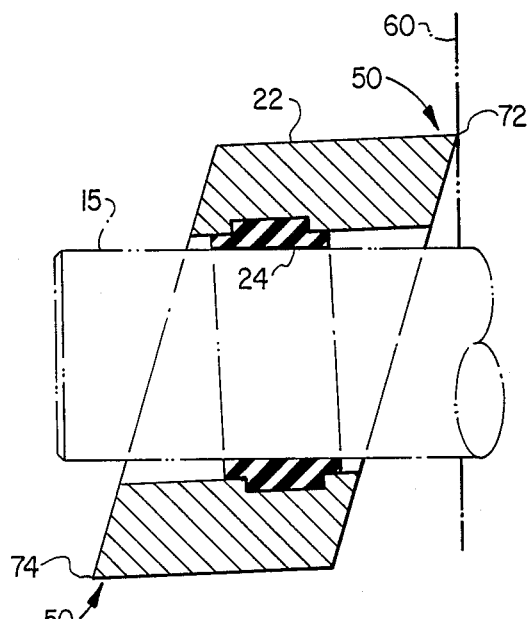

It is to be further understood that the weight engagement means of the present invention may be comprised of alternate structures which include that shown in FIGS. 7 to 9. As shown in those drawings, the outer section 22 of collar member 20 may include an outer end portion which is essentially flat but which is sloped with respect to a plane perpendicular to the aforementioned axis of the apparatus 10. The weight engagement means 50 in this embodiment comprise the axially outermost portions 72 and/or 74 of this outer end of section 22.

The positioning and "locking" of the weight retaining apparatus 10 onto the end of a bar 15 of a barbell, and the removal of the apparatus 10 therefrom, will be clear from the above description of its construction and from the following operational discussion. That is, the apparatus 10 is mounted and locked on a bar 15 by: (1) placing the apparatus 10 onto the bar so that the two are slidingly engaged with their respective axes substantially aligned with each other; (2) sliding the apparatus 10 along the length of the bar toward a weight member 60 on the bar until a weight engagement means 50, such as tab portion 52 or 54, of the apparatus 10 contacts or approaches the weight member; and (3) "locking" the apparatus 10 into a relatively fixed position on the bar by skewing an axis of the apparatus 10 with respect to an axis of said bar 15. The locking can be such that the tab portion 52, or 54 as the case may be, remains in contact with the weight, or alternatively does not contact the weight. During either type of locking, however, the side of the apparatus 10 which is diametrically opposite to the "contacting" tab portion 52 or 54, is moved relatively closer to said weight member 60 while remaining relatively spaced therefrom.

To remove apparatus 10 from the end of the bar 15, it is necessary first to "unlock" the apparatus 10 from the bar by realigning the collar and bar axes. In the preferred embodiment this can be done by moving the side of the apparatus 10 opposite to the tab portion 52 or 54 relatively farther away from the weight. The removal is then completed by sliding apparatus 10 axially along bar 15 away from said weight 60 until apparatus 10 has been removed from the bar 15.

It will be noted that the apparatus of the present invention can also be operated successfully simply by placing it on the bar and positioning it relatively near to the weight member, without "locking" the apparatus. In this situation any subsequent axially outward movement of the weight member 60 will cause the weight member 60 to contact the weight engagement means 50, causing the aforementioned skewing of the collar and bar axes, with the corresponding desired locking effect.

It will also be noted that the "gripping" or locking effect of the invention is increased with any axially outward displacement of the weight 60, or force transmitted from the weight 60 to the apparatus, axially toward the outer end of the bar 15. This increase in gripping or locking occurs at least in part because such further displacement and/or force, through the weight engagement means 50, causes an increase in frictional force between the bar 15 and the gripping means 24, by increasing the skewing of the axes of the apparatus and the bar, resulting in a more forceful contact and/or larger area of contact 48 between the bar 15 and the gripping means 24, as illustrated in FIG. 4.

It will be further noted that the construction of apparatus 10 described above facilitates control of the apparatus during assembly, positioning and locking, as well as during removal of the collar. In addition to the apparatus' use in retaining weights on a barbell, this assembly and removal of the apparatus 10 onto said bar can be useful during the process of adding or removing weights to or from a barbell, in that said assembly and removal is quick and easy in comparison to the devices presently available for such purposes.

It is clear that the present invention is well adapted to carry out the objects and attain the ends and advantages mentioned as well as others not specifically described. While preferred embodiments of the invention has been described for purposes of this disclosure, numerous changes may be made, both as described herein and otherwise, which changes will readily suggest themselves to those skilled in the art and which changes are encompassed within the spirit of the invention disclosed and as defined in the appended claims.

What is claimed is:

1. Apparatus for captively retaining a weight member on a weight lifting bar extending along a first axis and having an outer end portion slidably received in a central opening formed through the weight member, said apparatus comprising:
    a collar member having an annular cross-section and including a relative rigid radially outer portion, and a radially inner portion formed from a resilient frictional gripping material, said collar member extending along a second axis passing through a central opening formed in said radially inner portion and adapted to slidably receive said outer end portion of the weight bar to permit said collar member to be moved along said outer end portion of the weight bar against a frictional resistance force of said radially inner portion, toward and away from the weight member thereon, when said first and second axes are generally aligned; and
    weight engagement means, associated with said collar member and responsive to forceable interengagement with the weight member, for tilting said collar member on said outer end portion of the weigh bar, about a third axis generally transverse to said first axis, to thereby radially compress only axially spaced portions of said frictional gripping material against said outer end portion of the weight bar in a manner frictionally locking said collar member on the weight bar to prevent axially outward dislodgement of the weight member therefrom,
    said weight engagement means comprising an axially outer end portion of said radially outer portion of said collar member.

2. The apparatus of claim 1 wherein:
    said radially outer portion of said collar member is delimited at one end by an annular, generally planar first end surface which is tilted relative to a plane transverse to said second axis.

3. The apparatus of claim 2 wherein:
    said radially outer portion of said collar member is delimited at an opposite end by an annular, generally planar second end surface which is tilted relative to said plane transverse to said second axis.

4. The apparatus of claim 3 wherein:
    said first and second end surfaces are generally parallel.

5. Apparatus for captively retaining a weight member on a weight lifting bar slidably received in an opening in the weight member and having an outer end portion of said bar projecting outwardly therefrom along a first axis, said apparatus comprising:
    a collar member having a relatively rigid radially outer body section with an annular cross-section and an outer end and radially inner gripping means defining a central opening extending through said collar member along a second axis, said radially inner gripping means being configured to closely and removably receive said outer end portion of said bar in a manner permitting said collar member to be easily moved along said outer end portion, against a relatively low frictional resistance force between said gripping means and said outer end portion of said bar, toward and away from the weight member when said first and second axes are essentially aligned; and
    weight engagement means, carried by said collar member and responsive to forceable interengagement with the weight member, for tilting said collar member about a third axis generally transverse to said first axis to thereby radially press a portion of said gripping means against the weight bar in a manner frictionally and releasably locking said collar member on the weight bar to prevent axially outward dislodgement of the weight member therefrom,
    said weight engagement means having an outer end portion extending generally parallel to said second axis, proportion axially beyond said outer end of said radially outer body section, and forceably interengageable with the weight member in a manner transmitting the interengagement force to said collar member to tilt the same and frictionally lock the tilted collar member on the weight bar in a axially spaced relationship with the weight member.

6. The apparatus of claim 1 wherein:
    said weight engagement means comprise a tab member secured to an end of said radially outer collar member section and projecting generally axially outwardly therefrom.

7. The apparatus of claim 1 wherein:
    said radially outer collar member section has an outer end portion having an essentially planar axially outer surface which is sloped relative to a plane perpendicular to said second axis, and
    said weight engagement means comprise an axially outermost portion of said outer end portion of said radially outer collar member section.

8. The apparatus of claim 1 wherein:
    said radially outer collar member section has a circumferentially extending portion which projects axially outwardly from the balance thereof, and said weight engagement means comprise said circumferentially extending portion.

9. The apparatus of claim 5 wherein:
said radially inner gripping means are formed from a resilient material, and a portion of said resilient material is compressed in response to said tilting of said collar member to provide said frictional locking.

10. The apparatus of claim 1 wherein:
said gripping means are affixed to the interior of said radially outer section by an adhesive substance.

11. The apparatus of claim 5 wherein:
said gripping means are removably affixed to the interior of said radially outer body section by at least one flange portion formed on the radially external periphery of said gripping means and engaging a portion of said radially outer body section.

12. The apparatus of claim 5 wherein:
said weight engagement means comprise first and second weight member engaging tab members respectively formed on opposite ends of said radially outer body section and projecting radially outwardly therefrom, a selected one of said tab members being operatively engageable with the weight member whereby said apparatus is reversably positionable on said weight bar.

13. The apparatus of claim 12 wherein:
said first and second tab members are circumferentially offset from one another.

14. The apparatus of claim 13 wherein:
said first and second tab members are circumferentially offset from one another by an angle of approximately 180°.

* * * * *